UNITED STATES PATENT OFFICE.

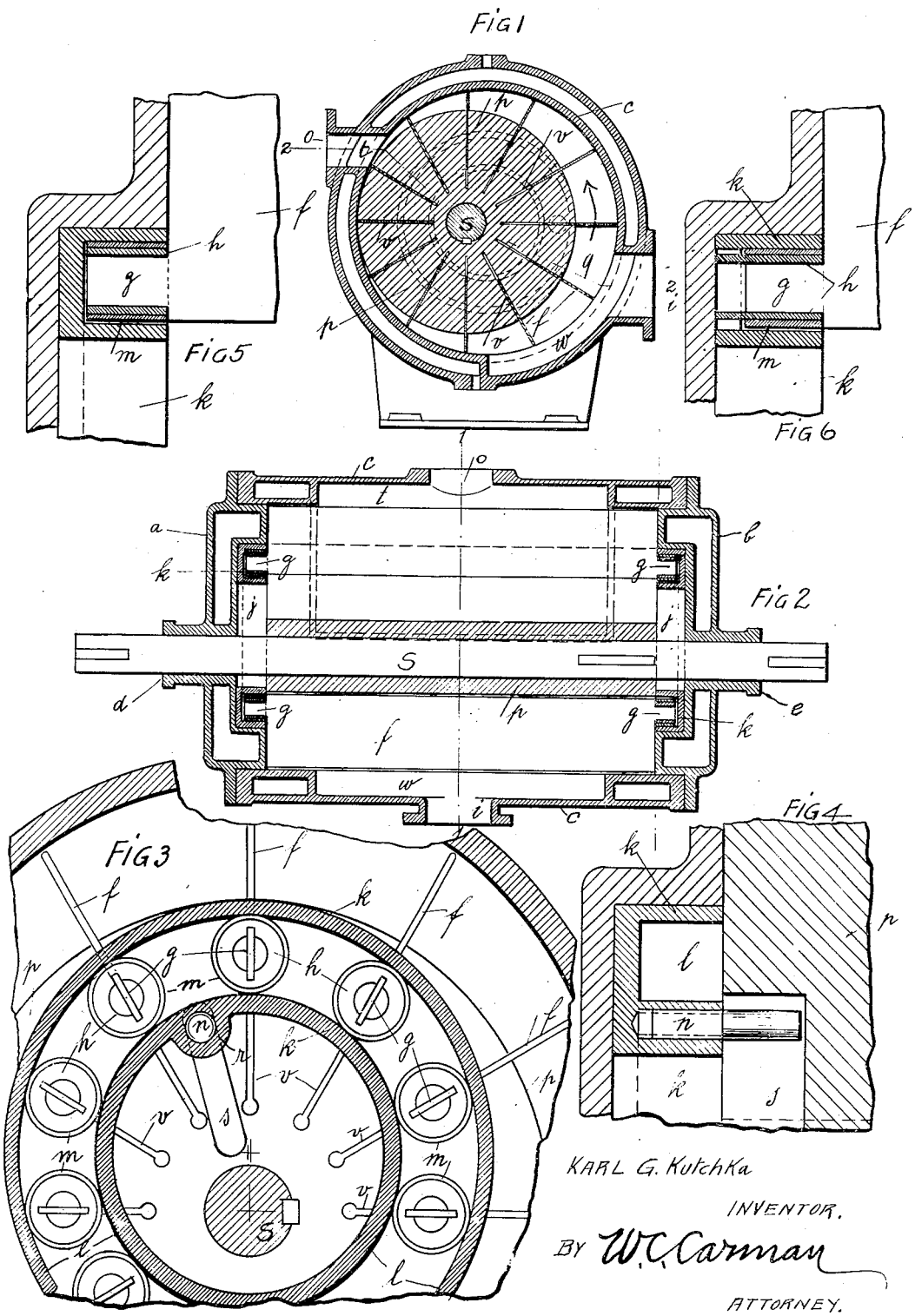

KARL G. KUTCHKA, OF YOUNGSTOWN, OHIO.

ROTARY ENGINE OR PUMP.

1,336,845.

Specification of Letters Patent.  Patented Apr. 13, 1920.

Application filed July 11, 1918. Serial No. 244,500.

*To all whom it may concern:*

Be it known that I, KARL G. KUTCHKA, subject of the Emperor of Austria, residing at Youngstown, in the county of Mahoning and State of Ohio, have invented certain new and useful Improvements in Rotary Engines or Pumps, of which the following is a specification.

This invention relates to rotary engines, compressors or pumps, the primary object being to produce a device of this character of maximum efficiency and minimum strain and wear upon the component parts.

The invention consists primarily of a cylinder within which is eccentrically mounted a rotating piston provided with longitudinal, radial grooves or slots carrying reciprocating operating blades or wings.

Figure 1 is a cross-section on the line 1—1 of Fig. 2; Fig. 2 is a longitudinal-section on the line 2—2 of Fig. 1; Fig. 3 is a cross-section through the center or guide ring; Figs. 4, 5 and 6 are fragmentary views showing various details of the center ring and its relation to or connection with the operating blades.

The same reference characters indicate the same parts throughout the several figures of the drawings.

C represents the cylinder, with its two cylinder heads $a$ and $b$ provided, respectively, with the in-let and out-let openings $i$ and $o$, and with suitable water jackets for cooling or heating purposes as may be desired.

P represents the rotating piston mounted upon the shaft S which, in turn, is mounted in the eccentric bearings $d$ and $e$ formed in the cylinder heads $a$ and $b$, respectively, these bearings being so disposed in the cylinder heads that at one point in the cylinder there will be merely a working clearance between the periphery of the piston and the inner wall of the cylinder, while the opposite point in the cylinder will be the widest portion or part of the crescent-shaped space or chamber $q$ between the piston and the cylinder. To the outer ends of this shaft suitable wheels or pulleys may be attached for the necessary and proper transmission of power.

The piston $p$ is provided with a plurality of longitudinal, radial open grooves or slots $v$ extending the full length of the cylinder and from its surface toward its center.

Loosely and slidably mounted in these grooves are the reciprocating operating blades $f$, extending from end to end. Each of these blades is provided at its inner edge with oppositely disposed elongated portions $g$, each of which is fitted with a cylindrical pin $h$, the purpose of which will be immediately explained.

The inner face of each cylinder head, $a$ and $b$, is formed with a substantially concentric annular recess $j$, within which is rotatably mounted a guide or center ring $k$. This ring is also provided in its inner face with a concentric annular groove $l$ in which the pins $h$ carried by the operating blades travel. If desired, the pin $h$ may be provided with a sleeve or roller $m$, which will contact with the opposite walls of the groove $l$ in the ring $k$, thus reducing the friction between these elements.

In order that the center or guide ring $k$ may revolve with the same speed as the piston $p$, these two elements may be connected by the pin $n$, one end of which is fastened to the ring at its enlarged portion $r$, while the other end slidably engages the slot $s$ in the end of the piston, thus affording compensation made necessary by reason of the difference in the axes around which these two elements revolve. Another method of accomplishing the same purpose is shown in Fig. 6, where the pin $h$ extends into an opening in the end of the ring $k$.

It is obvious that as the piston $p$ revolves, the operating blades $f$ will be forced outwardly into the chamber $q$ by centrifugal force, while at the same time the same reciprocating motion would be imparted to these blades through the engagement of pins $h$ on the blades with the annular groove $l$ in the center ring, and this construction also performs the further very desirable function of maintaining the outer edges of the blades a uniform distance from the inner wall of the cylinder, allowing merely a working clearance between the same, thus entirely avoiding friction between these two parts of the construction.

Briefly described, the operation of my invention is as follows, used as a compressor: The air enters at the opening $i$ through chamber $w$ into chamber $q$, and as the piston rotates in the direction of the arrow the operating blades will be forced outwardly into chamber $q$, where they will pick up the air and force it forward into a constantly decreasing space until it reaches the chamber t, into which it passes and is discharged through the opening o into suitable retaining means or supply lines.

Used as an engine, the operation is, of course, reversed,—the motive power entering at the opening o, through the chamber t and into the chamber q, where it gradually expands, forcing the blades ahead of it, until it reaches the opening i, through which it escapes.

I claim:

1. In a rotary engine, compressor or pump, a cylinder having an in-let and an out-let opening, in combination with a rotating piston eccentrically mounted therein and provided with grooves in which reciprocating blades are carried, rings to control the movement of said blades, and a pin carried by each of said rings and slidably engaging a radial slot in the end of the piston.

2. In a rotary engine, compressor or pump, a cylinder having an in-let and an out-let opening, in combination with a rotating piston eccentrically mounted therein and provided with grooves in which reciprocating operating blades are carried, guide rings carried in the inner face of the cylinder heads to control the movement of the blades, and a pin carried by each of said rings and slidably engaging a radial slot in the end of the piston.

3. In a rotary engine, compressor or pump, a cylinder having an inlet and an out-let opening, in combination with a rotating piston eccentrically mounted therein and provided with grooves in which reciprocating operating blades are carried, guide rings carried in the inner faces of the cylinder heads to control the movement of said blades,—said blades being provided with elongated portions at their inner edges to engage said rings, and a pin carried by each of said rings and slidably engaging a radial slot in the end of the piston.

4. In a rotary engine, compressor or pump, a cylinder having an in-let and an out-let opening, in combination with a rotating piston eccentrically mounted therein and provided with grooves in which reciprocating operating blades are carried, guide rings carried in the inner faces of the cylinder heads to control the movement of said blades,—said rings being provided with annular grooves and said blades being provided with elongated portions to engage said grooves, and a pin carried by each of said rings and slidably engaging a radial slot in the end of the piston.

In testimony whereof I hereunto affix my signature in the presence of two witnesses.

KARL G. KUTCHKA.

Witnesses:
JOHN A. FITHIAN,
B. W. BROCKWAY.